(12) United States Patent
Horiuchi et al.

(10) Patent No.: US 7,578,516 B2
(45) Date of Patent: Aug. 25, 2009

(54) AIR BAG SUPPORT BELT STORING STRUCTURE

(75) Inventors: Tadanori Horiuchi, Wako (JP); Haruka Tsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 256 days.

(21) Appl. No.: 11/530,219

(22) Filed: Sep. 8, 2006

(65) Prior Publication Data
US 2007/0063491 A1 Mar. 22, 2007

Related U.S. Application Data

(60) Provisional application No. 60/715,154, filed on Sep. 9, 2005.

(51) Int. Cl.
*B60R 21/20* (2006.01)
(52) U.S. Cl. .................................. 280/728.3
(58) Field of Classification Search ............. 280/728.2, 280/728.3, 730.2, 743.2; 24/602, 704.1
See application file for complete search history.

(56) References Cited

U.S. PATENT DOCUMENTS 5,211,421 A * 5/1993 Catron et al. ............ 280/728.2
6,007,090 A * 12/1999 Hosono et al. ........... 280/730.2

FOREIGN PATENT DOCUMENTS

JP      2003-327182 A      11/2003

\* cited by examiner

*Primary Examiner*—Paul N. Dickson
*Assistant Examiner*—Robert A. Coker
(74) *Attorney, Agent, or Firm*—Westerman, Hattori, Daniels & Adrian, LLP.

(57) ABSTRACT

An air bag support belt storing structure includes an air bag module, support belts connecting an air bag to the vehicle body, storage spaces that extend in the front-rear direction of the vehicle body for storing the support belts. The storage spaces are provided on left and right sides on the rear side of the air bag module.

3 Claims, 14 Drawing Sheets

(a) (b)

AIR BAG SUPPORT BELT STORING STRUCTURE

This application claims benefit of earlier filed U.S. Provisional Application No. 60/715,154 filed on Sep. 9, 2005.

TECHNICAL FIELD

The present invention relates to an air bag support belt storing structure, particularly to an air bag support belt storing structure for an air bag mounted on a motorcycle.

BACKGROUND OF THE INVENTION

Unlike a typical four-wheel vehicle, a motorcycle rider is not restrained to the vehicle body by a seat belt or the like. Therefore, to effectively restrain the rider, it is known, for example, to provide support belts that are fixed at one end to the vehicle body and at the other end to the air bag so that, upon inflation of the air bag, the air bag is supported by the connected support belts in addition to a case portion in which the air bag has been stored.

For example, Japanese Patent Laid-open No. 2003-327182 discloses an air bag system, for a motor scooter type motorcycle, in which support belts for an air bag are stored in a left-right pair of storing grooves provided over the range from a front cover through a leg shield and a foot mount portion to a rear cover. Accordingly, the rider can be restrained if the vehicle body displays large yawing and rolling behaviors, without having to enlarge the capacity of the air bag.

SUMMARY OF THE INVENTION

In the case of using the air bag support belts as above-mentioned, it is preferable to provide the support belt storing portion with a cover member for protection against the influences of external factors such as weather. Conventionally, as the structure of such a over member, there has been generally adopted a system in which pawl-like projections are provided at several positions on the back side of the cover member, and the projections are connected in the manner of fitting into a fitting groove provided on the storing portion side. However, one problem with the aforementioned (and similar) fitting structures, is that disengagement of the parts may occur due to some shock, e.g. in situations other than the situation where the support belts are pulled out attendant on the inflation of the air bag.

Accordingly, is an object of the present invention to solve the above-mentioned problems by providing an air bag support belt storing structure preferable for application with an air bag mounted on a motorcycle.

In order to achieve the above object, one aspect of the present invention is characterized in that, in an air bag support belt storing structure comprising support belts for connecting an air bag and a vehicle body, an air bag module is disposed at or approximately at the center, in the vehicle widthwise direction of the vehicle body, and spaces for storing the support belts extend in the front-rear direction of the vehicle body, and are provided on the left and right sides on the rear side of the air bag module. Accordingly, the support belts for the air bag can be stored in the vicinity of a position on a shortest straight line segment connecting the air bag storing portion and a fixed position on the vehicle body side.

According to another aspect of the present invention, the spaces are each covered with a cover, e.g., resin-made cover. Accordingly, the support belts for the air bag can be protected from external factors, for example, the outdoor environments such as rain and dust, mischief, etc.

According to another aspect of the present invention, the cover is opened to the outside, with its one side on the outer side in the vehicle width direction as an axis. Accordingly, it is possible to obtain an air bag support belt storing structure free of the possibility that the belt covers opened at the time of inflation of the air bag might make contact with the rider or the like.

According to another aspect of the present invention, the cover is fixed by fastening to the vehicle body side at its one side on the outer side in the vehicle width direction, and is fixed by fitting to the vehicle body side at its one side on the inner side in the vehicle width direction, and a roughly central portion of one side on the inner side in the vehicle width direction of the cover is fixed by a clip. Accordingly, it is possible to obtain an air bag support belt structure which is less liable to be disengaged at normal time and, yet, is appropriately opened at the time of inflation of the air bag.

According to another aspect of the present invention, the clip is engaged in a hole provided in the cover, and the hole is provided with a brittle portion. Accordingly, the pulling load necessary for opening the belt covers can be regulated by modifying the strength of the brittle portions.

BRIEF DESCRIPTION OF THE DRAWINGS

An embodiment of the present invention will be described with reference to the accompanying drawings, wherein.

DETAILED DESCRIPTION OF THE INVENTION

Figure 1:
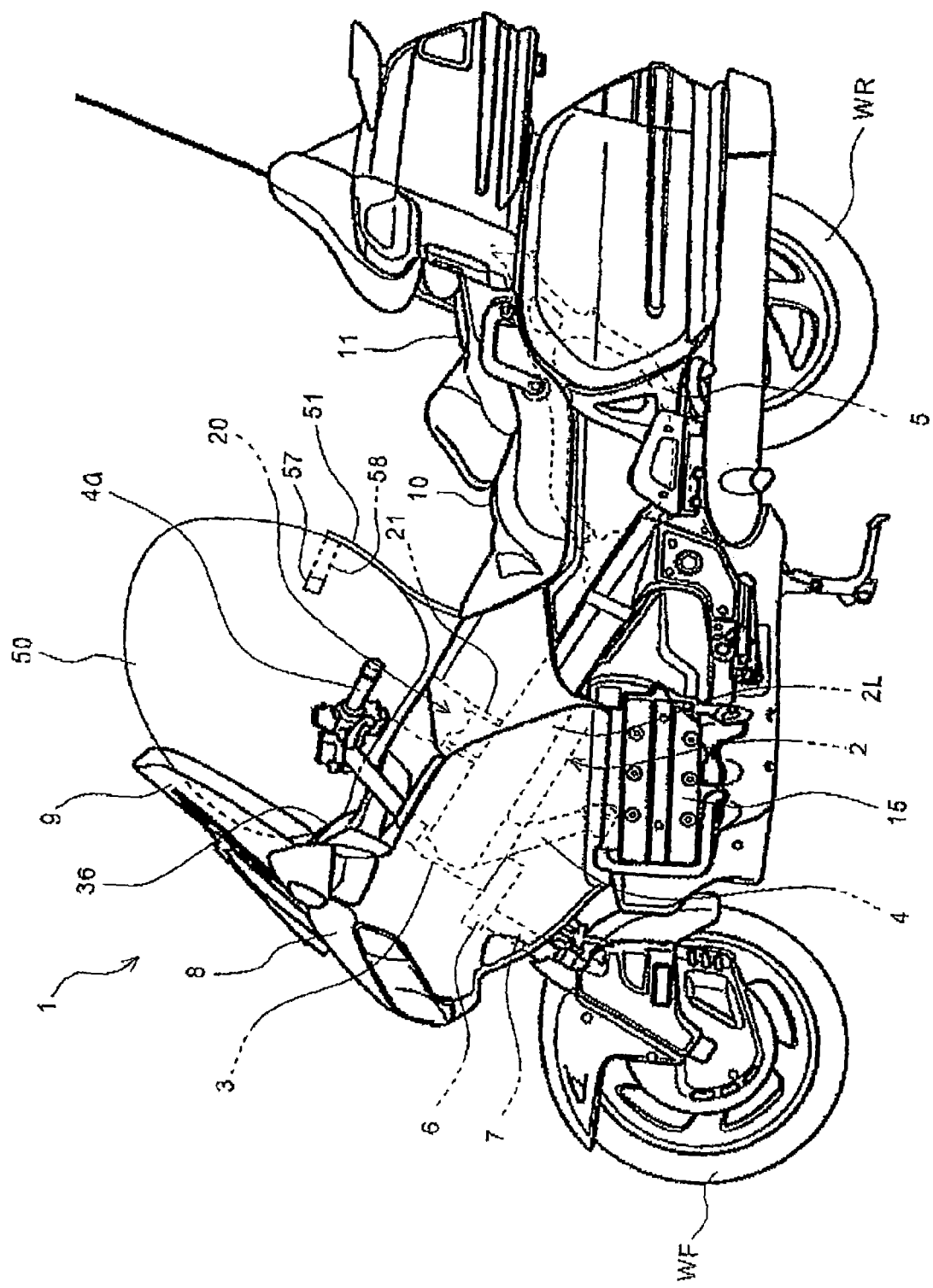
FIG. 1 is a general illustration of a motorcycle according to one embodiment of the present invention.

Embodiments of the present invention will be described with reference to the accompanying drawings FIG. 1 is a general illustration of a motorcycle 1 to which an air bag support belt storing structure according to one embodiment of the present invention has been applied. A frame 2 of the motorcycle 1 is composed mainly of a left-right pair of upper tubes 2L and 2R (see FIG. 4) extending skewly downwards toward the vehicle body rear side from a head pipe 3. Lower tubes 4 are extended downwards from portions, near the head pipe 3, of the upper tubes 2L and 2R, and an engine 15 as a drive source is fixedly suspended from the tip ends of the lower tubes 4. A left-right pair form front fork 7 steerable by a steering handle 4a is rotatably mounted on the head pipe 3 through a lower bracket 6, and a front wheel WF is rotatably supported on lower end portions of the front fork 7. In addition, a seat frame 5 for supporting a main seat 10, a rear seat 11 and the like is connected to the vehicle body rear side of the frame 2, and a rear wheel WR as a drive wheel is rotatably supported on rear end portions of a swing arm (not shown) swingably connected to the frame 2.

The motorcycle 1 according to this embodiment is provided with an air bag 50 which can be inflated into a roughly spherical form so sized as to range from the upper side of the main seat 10 to the vicinity of a windscreen 9, which is provided at an upper end portion of an upper cowl 8, while making contact with a meter case 36. An air bag module 20 for integrally storing the air bag 50 and an inflator (not shown) for generating a gas for inflating the air bag 50 is fixed to the upper tubes 2L and 2R by support stays 21, at a position on the vehicle body front side relative to the seated position of the rider. Incidentally, support belts 51 connected to the vehicle body rear side of the air bag 50 are for holding the air bag 50 in an appropriate position so as to effectively capture the rider, and the air bag support belt storing structure according to the present invention is applied to storing spaces for the support belts 51 and covers for the storing spaces.

Figure 2:
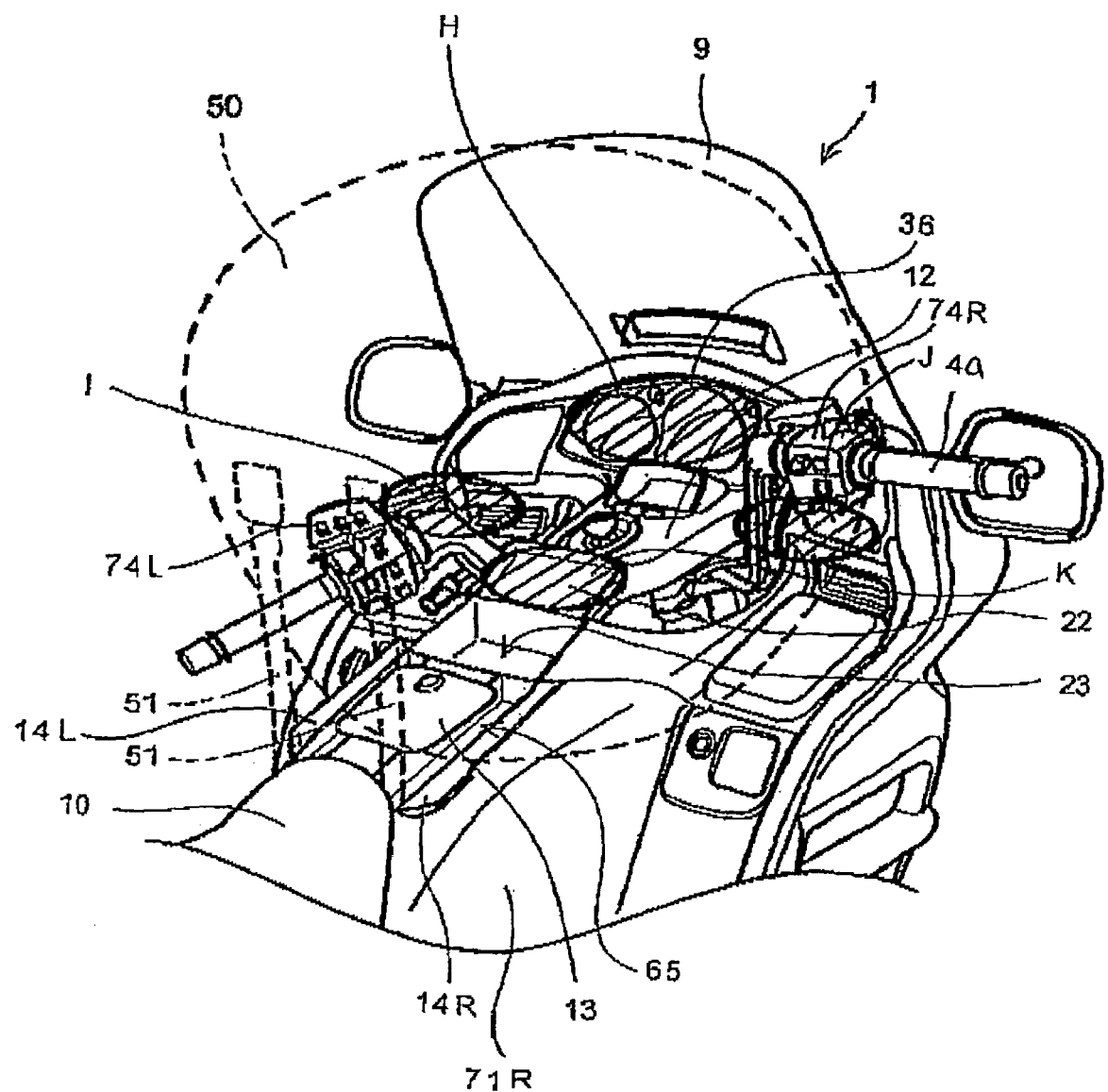
FIG. 2 is an enlarged view of a part of the motorcycle according to one embodiment of the present invention.

FIG. 2 is an enlarged view of a part of the motorcycle 1 to which the air bag support belt storing structure according to one embodiment of the present invention has been applied. The same symbols as used above denote the portions the same as or equivalent to the portions above-mentioned. The air bag module 20 (see FIG. 1) has a configuration in which the inflator and the air bag 50 in its folded state are stored in a box-like casing 23 and an upper portion of the casing 23 is closed with a module cover 22. The air bag module 20 is disposed at a position between an ignition cover 12, which covers the upper side of a top bridge (not shown) connecting the steering handle 4a and the front fork 7, and a fuel feed port lid 13 located on the upper side of the fuel tank (not shown). At the time of inflation of the air bag 50, a gas from the inflator is instantaneously supplied into the air bag 50 inside the casing 23, and, by the pressure of the gas, the module cover 22 is opened, with its one side on the vehicle body front side as an axis.

In addition, support belts 51 stored in a folded state in storing spaces 65 under belt covers 14L, 14R at normal time are developed (unfolded) to the positions indicated by broken lines in the figure while forcibly opening the belt covers 14L, 14R respectively to the left and right sides, attendant on the inflation of the air bag 50. Incidentally, while the steering handle 4a is operated to the left in the figure, a front lower portion of the air bag 50 is, upon the inflation of the air bag 50, stably supported at four positions, namely, two positions consisting of portion I in the vicinity of a left-side switch portion 74L and portion J in the vicinity of a right-side switch portion 74R under the neutral condition of the steering handle 4a plus two positions consisting of portion H of the meter case 36 and portion K of the module cover 22.

The air bag support belt storing structure according to this embodiment is characterized in that the storing spaces 65 for storing the support belts 51 are provided to extend in the vehicle body front-rear direction, on the left and right sides on the rear side of the air bag module 20. Incidentally, lower end portions of the support belts 51 are firmly fastened to a vehicle body side member on the lower side of the main seat 10 located on the upper side of a top shelter 71 R.

Figure 3:
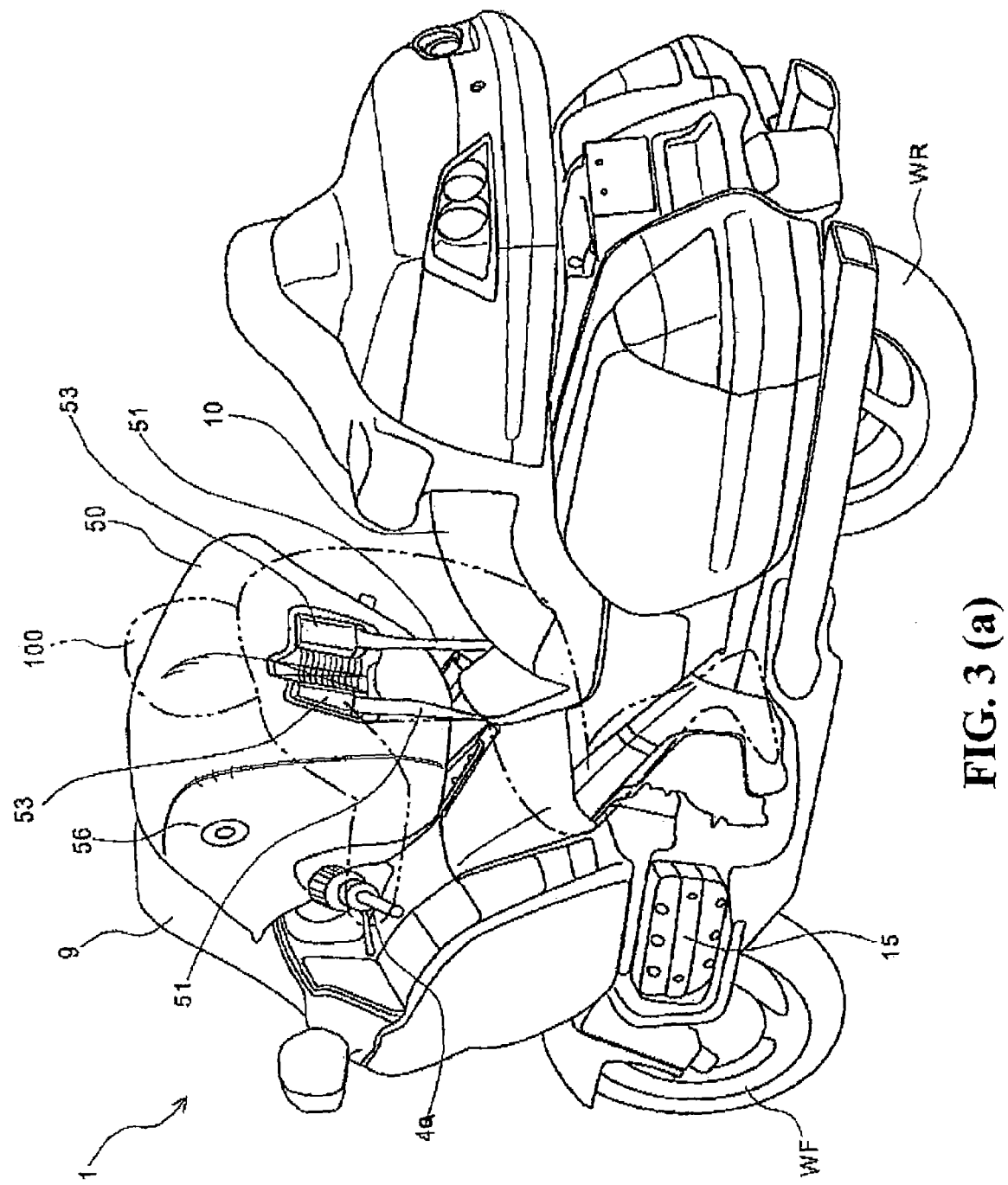
FIG. 3A is a perspective illustration of the motorcycle according to one embodiment of the present invention.
FIG. 3B is a side view showing the condition where the rider is captured by an air bag.
FIG. 3C is a sectional view of the air bag at a portion making contact with the head of the rider.
FIG. 3D is a sectional view of the air bag at a portion making contact with the chest of the rider.
Figure 3:
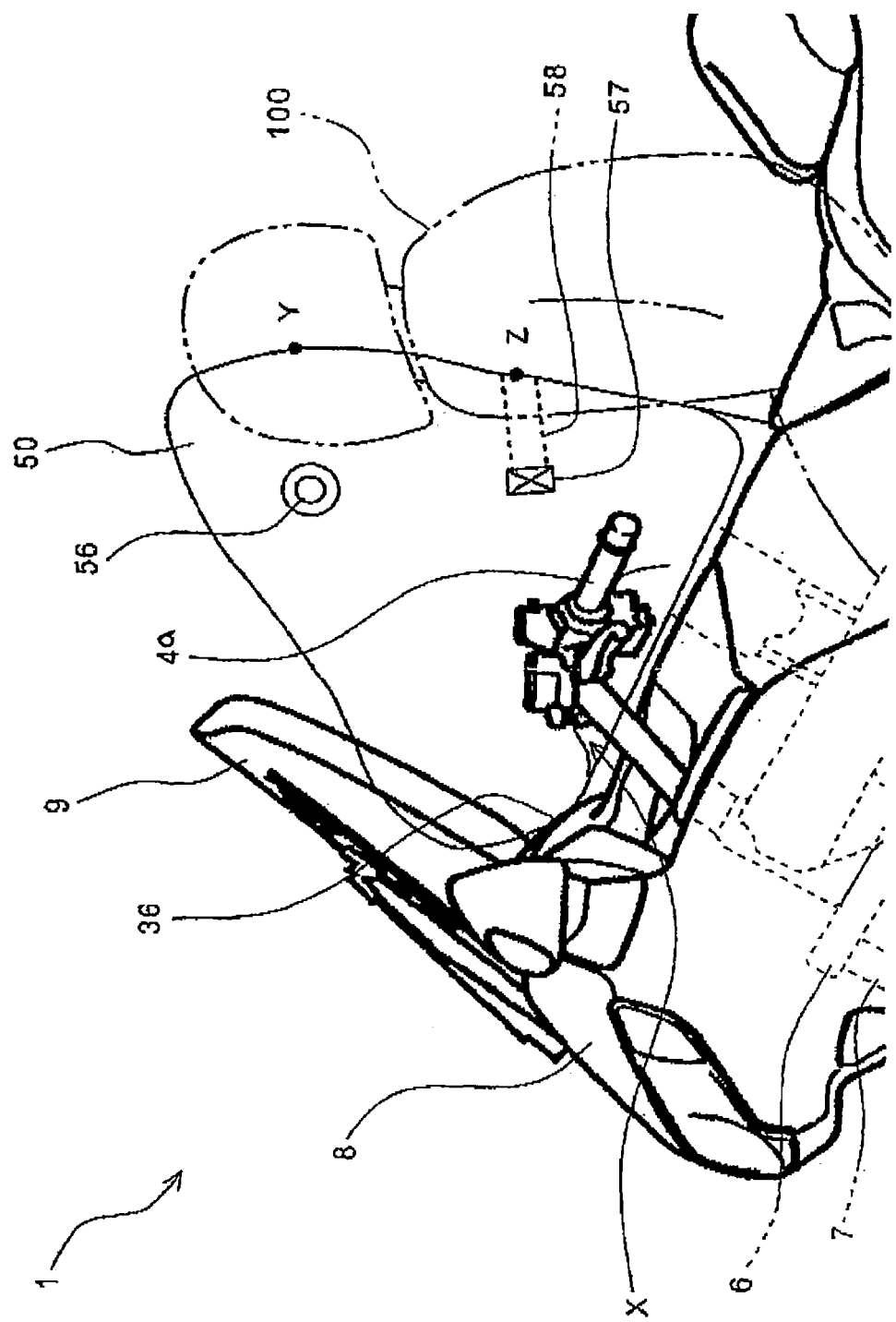
Figure 3:
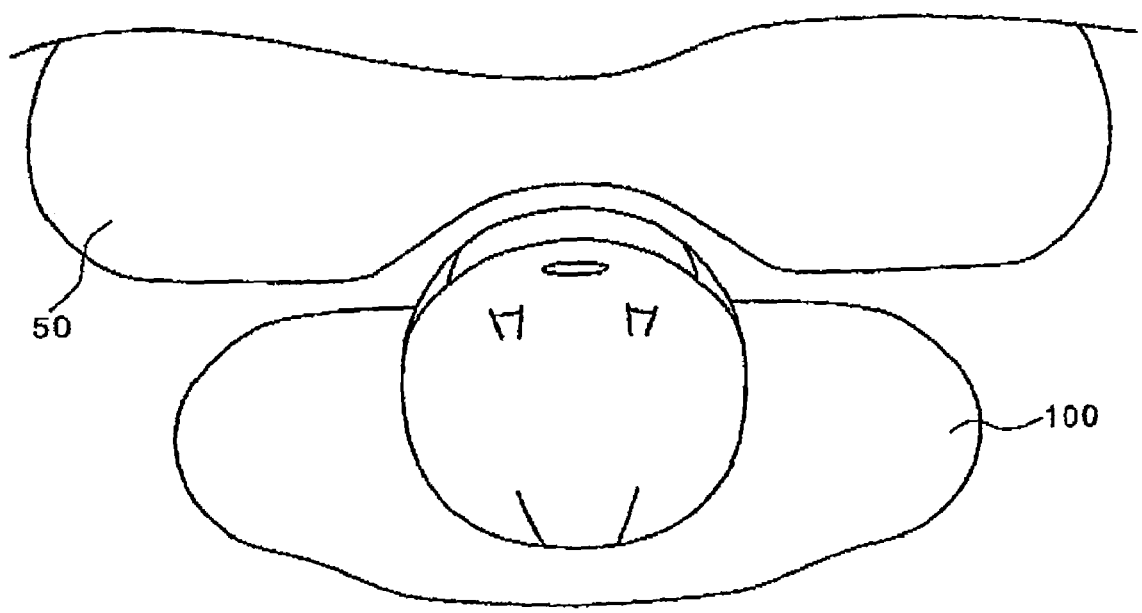
Figure 3:
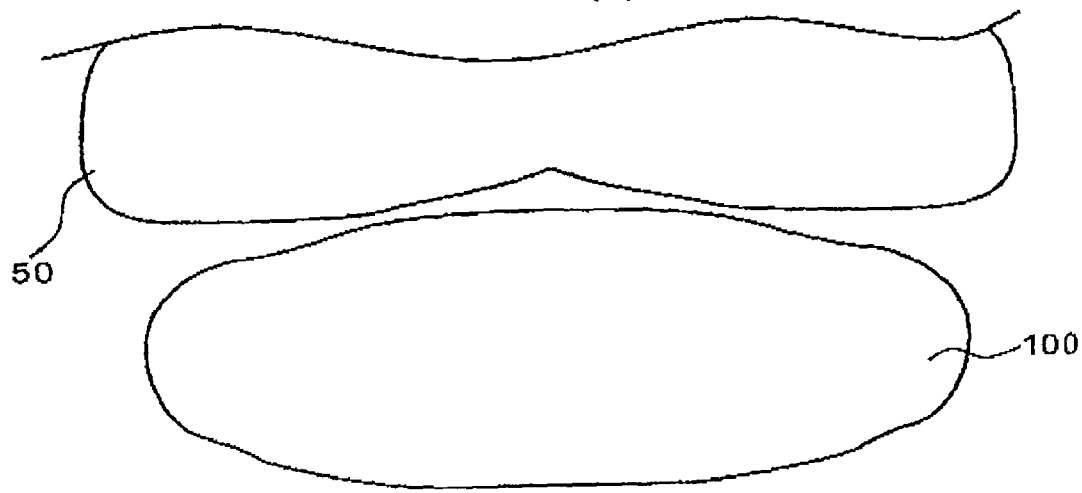

FIG. 3A is a perspective illustration of the motorcycle 1 upon inflation of the air bag 50. The air bag 50 is configured so that its surface on the rider's side assumes a roughly V-shaped form upon inflation, for effectively enveloping the rider 100. Further, the air bag 50 is so configured as to be supported not only by the support belts 51 but also by the whole of the members located at the front lower portion of the air bag 50, such as the steering handle 4a and the meter case 36, as above-mentioned. In addition, the air bag 50 is provided in left and right surfaces of an upper portion thereof with vent holes 56 (for example, φ45) for exhausting the gas at an appropriate rate while holding the rider.

FIG. 3B generally shows the condition where the air bag 50 has been inflated to capture the rider 100. A second support belt 58 for joining left right joint portions 57 in an arched form is provided on the lower side of the vent holes 56. The second support belt 58 restrains the air bag 50 from being developed largely in the left-right direction at the time of capturing the rider 100. Besides, portions X in a recessed shape corresponding to the projected shape of the steering handle 4a, which are provided at left and right lower portions of the air bag 50, also contribute to effective support of the air bag 50.

FIGS. 3C and 3D show the sectional shapes of the air bag 50 at Y-point (the head) and Z-point (the chest) in FIG. 3B. As shown in the figures, the V-shaped form provided in the rear surface of the air bag 50 are formed according to the shapes of the head and the chest of the rider 100, which promises a more efficient capturing of the rider 100.

Figure 4:
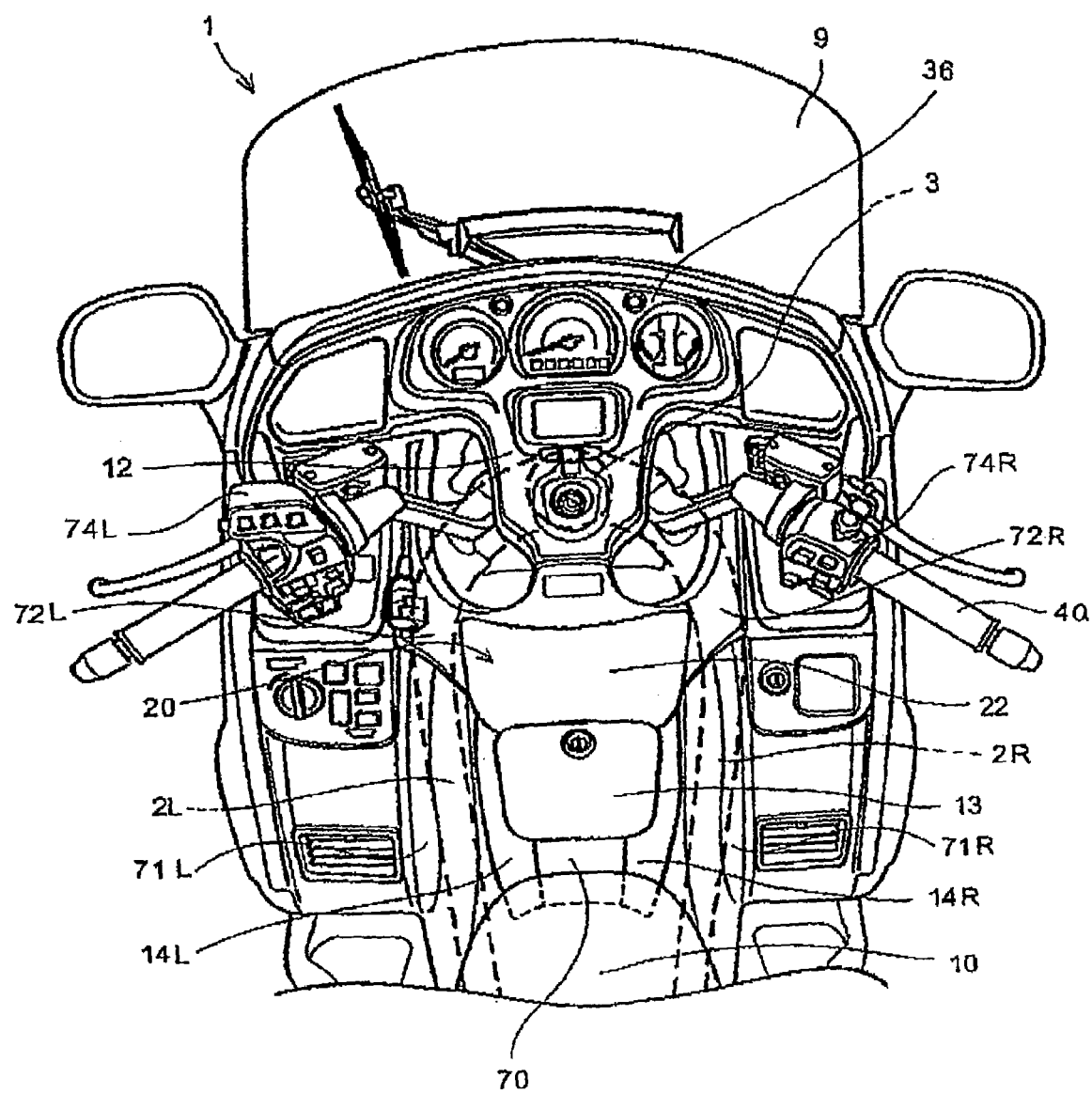
FIG. 4 is an illustration of the layout of an air bag module, as viewed from the upper side of the motorcycle.

FIG. 4 is an enlarged view of a part of the motorcycle 1 to which the air bag support belt storing structure according to one embodiment of the present invention has been applied. The same symbols as used above denote the portions the same as or equivalent to the portions above-mentioned. The figure shows the condition before inflation of the air bag 50. The upper tubes 2L and 2R connected to the head pipe 3 are extended toward the vehicle body rear side so as to form substantially circular arcs in the opposite directions, and the air bag module 20 is so disposed that its whole width is accommodated between the upper tubes 2L and 2R. In addition, the top surfaces of the belt covers 14 in the closed state thereof form smooth surfaces along the oil feed port lid 13, in the same manner as the top shelters 71L, 71R and front covers 72L, 72R; therefore, the provision of the air bag module 20 does not generate a projected portion or the like in the vehicle width direction, and does not influence the riding posture of the rider or the like. Incidentally, a top shelter 70 constituting a part of the armor is disposed on the vehicle body rear side of the oil feed port lid 13.

Figure 5:
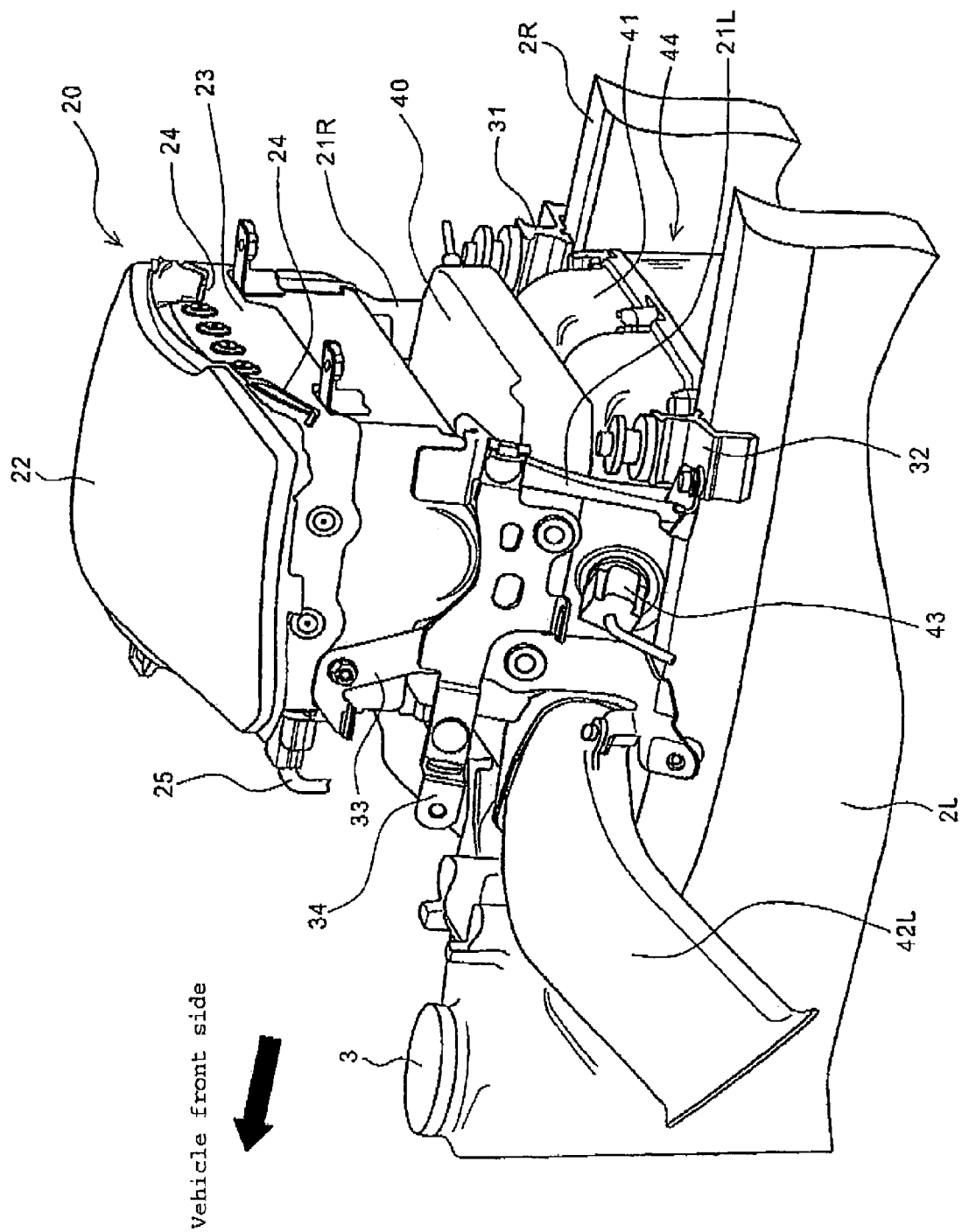
FIG. 5 is a perspective view showing the mounting structure of the air bag module according to one embodiment of the present invention.

FIG. 5 is a perspective view showing the mounting structure of the air bag module 20. The same symbols as used above denotes the portions the same or equivalent to the portions above-mentioned. A left-side support stay 21L and a right-side support stay 21R are fused to lower portions of the casing 23 of the air bag module 20, and are fixed by predetermined bolts to support members 30 (not shown), 31, 32 fused to the upper tubes 2L, 2R. A connector 25 provided at a side surface on the vehicle body front side of the casing 23 is inputting an ignition signal to the inflator stored in the casing 23.

An air cleaner box 44 for filtering the outside air to be introduced in the engine 15 and an upper cover 41 thereof are so disposed as to be clamped between the upper tubes 2L and 2R, and a roughly rectangular parallelopiped audio unit 40 is disposed on the upper side thereof. In addition, an FI unit support stay 34 for fixing a fuel injection control (FI) unit and a left-side air duct 42L for leading the outside air from the vehicle body front side into the air cleaner box 44 are fixed to a third support stay 33 disposed between the casing 23 and the upper tube 2L. Incidentally, a connector 43 for outputting a signal from an intake air temperature sensor disposed in the air cleaner box 44 is disposed on a side surface of the upper cover 41. Besides, a side surface on the rider's side of the casing 23 is provided with slits 24 as gaps for passing the support belts 51 therethrough.

According to the mounting structure of the air bag module 20 as above-mentioned, the space generated on the lower side of the air bag module 20 for attaining an optimum layout of the air bag module 20 can be effectively utilized as installation spaces for other component parts, so that a reduction in the inside volume of the installation space for the air bag module 20 can be realized. In addition, by removing the FI unit support stay 34 and the third support stay 33 from the mounted condition shown in the figure, the audio unit 40 and the upper cover 41 can be removed while working on the vehicle body left side, without moving and removing the air bag module 20. Therefore, maintenance work such as replacement of an air filter (not shown) provided inside the air cleaner box 44 can also be conducted easily.

Figure 6:
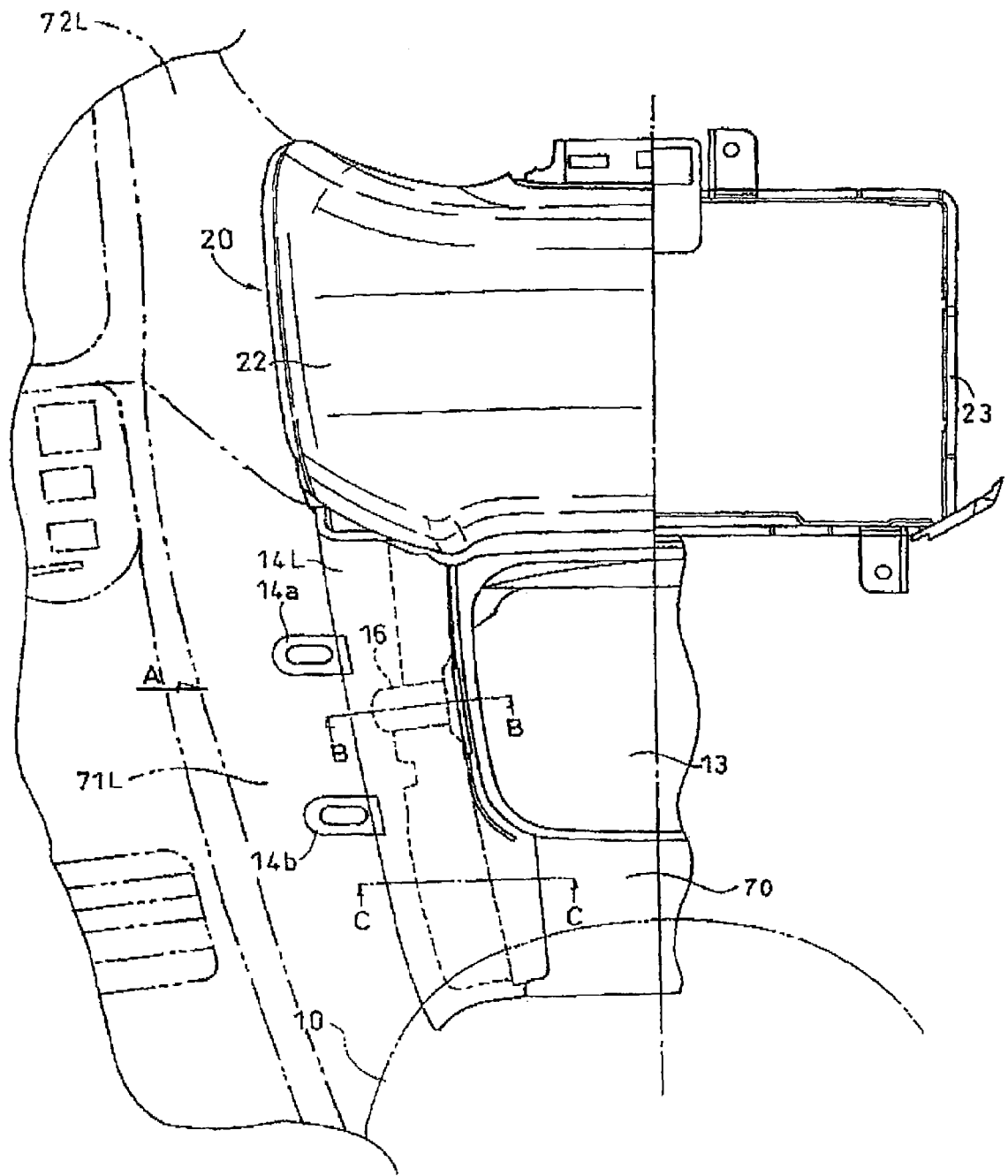
FIG. 6 is an enlarged view of a part of FIG. 3.

FIG. 6 is an enlarged view of a part of FIG. 4, and shows the configuration at and around the belt cover 14. The same symbols as used above denote the portions the same as or equivalent to the portions above-mentioned. Incidentally, the right-hand half of the figure shows the shape of the upper surface of the casing 23. The belt cover 14 is supported on the vehicle body at three points by cover stays 14a, 14b, 16 so that, at the time of inflation of the air bag 50, the connection between the cover stay 16 and the vehicle body side is broken by the force with which the support belt 51 is pulled out, and the belt cover 14 is opened to the outer side in the vehicle width direction, with the two points of the cover stays 14a and 14b as an axis.

Figure 7:
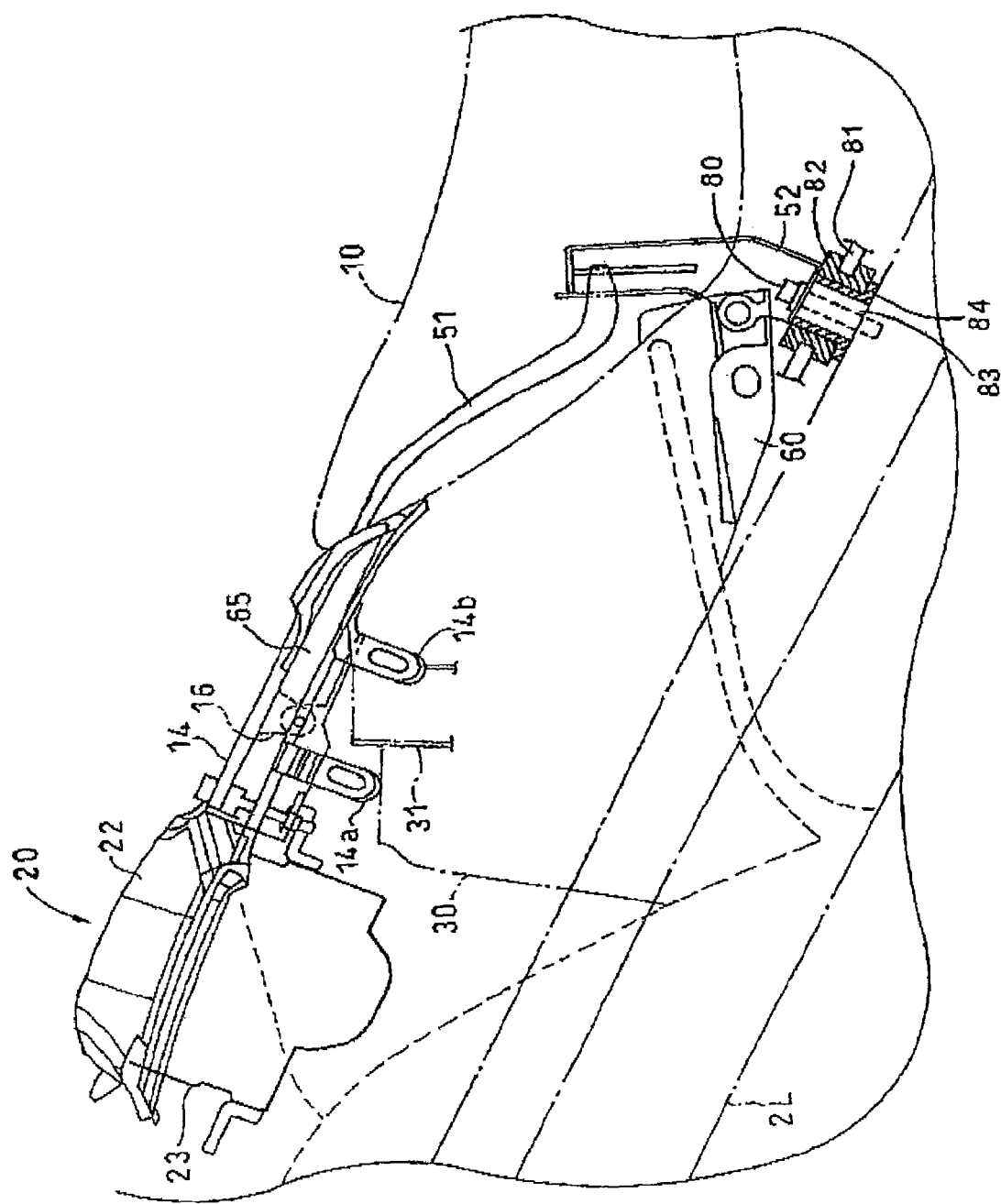
FIG. 7 is a view along arrow A of FIG. 5.

FIG. 7 is a view taken along arrow A of FIG. 6, and shows the layout of the air bag support belt storing structure as viewed from the vehicle body left side. The same symbols as used above denote the portions the same or equivalent to the portions above-mentioned. The layout of the storing spaces 65 permits effective utilization of surplus spaces generated on both sides in the vehicle width direction of the oil feed port lid 13 (see FIG. 6) located on the upper side of an oil feed port 31 of the fuel tank 30. In addition, the support belt 51 connected at its one end to the air bag 50 stored in the inside of the air bag module 20 is fixed at its other end to an upper portion of a belt stay 52 proximate to the support member 60 on the vehicle body side. The belt stays 52 are fastened to the left and right upper tubes 2L, 2R through metallic collars 83, 84 by bolts 80. An attaching portion 81 of the fuel tank 30 is floatingly connected to a resin-made ring 82 fitted over the outer periphery of the collar 84. Of the support belt 51, the portion which constitutes a surplus length at normal time is stored, in a folded state, in the storing space 65.

Figure 8:
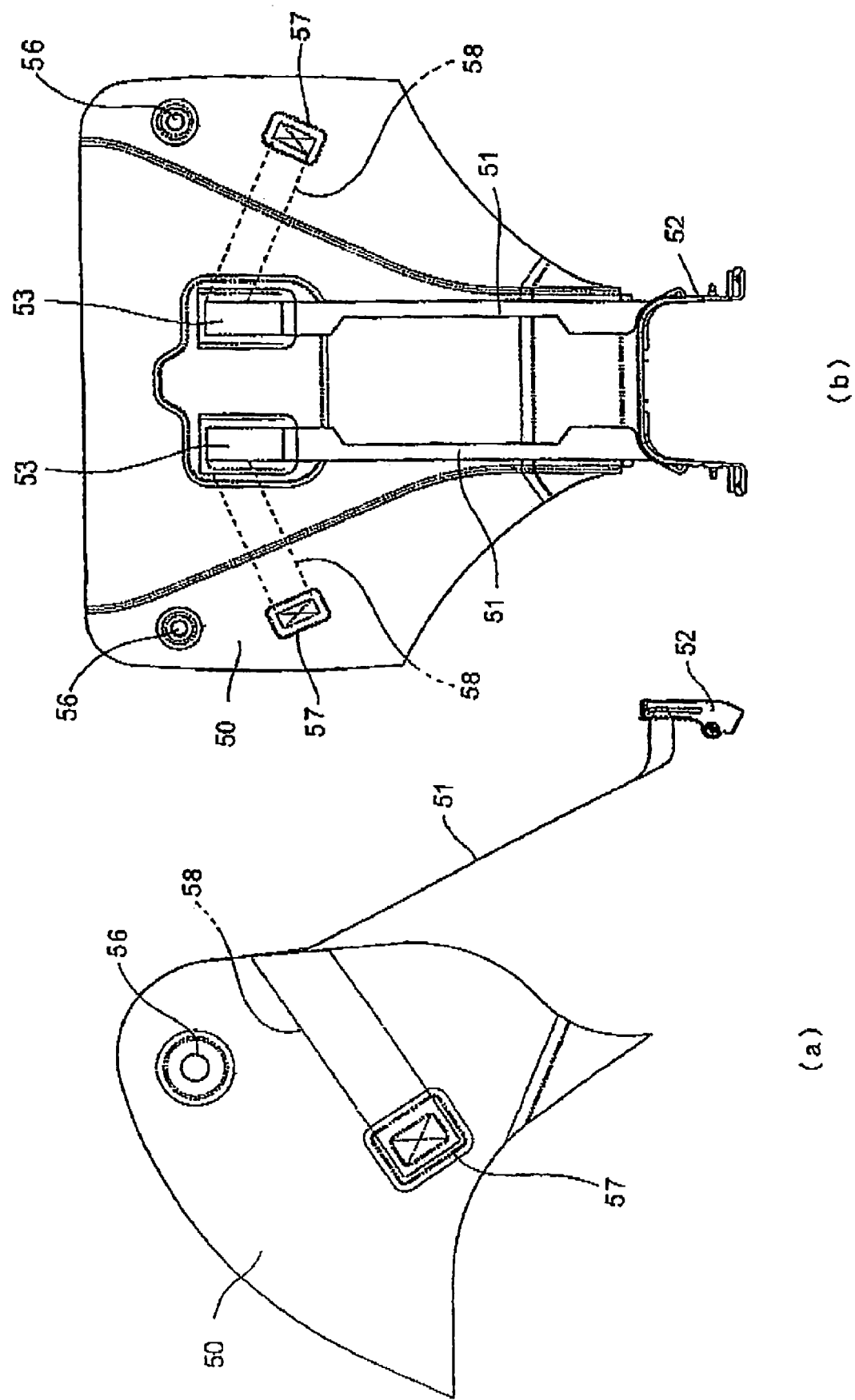
FIG. 8 shows a side view and a front view of an air bag according to one embodiment of the present invention.

FIGS. 8(a) and (b) are a side view (a) and a front view (b) of the air bag 50 according to one embodiment of the present invention. The same symbols as used above denote the portions the same as or equivalent to the portions above-mentioned. Both side surfaces of the air bag 50 are provided in upper portions thereof with the vent holes 56 for releasing the gas at an appropriate rate while holding the rider, immediately upon inflation of the air bag 50. In addition, from joint members 53 of the support belts 51, the second support belts 58 contributing to the holding of an optimum air bag shape at the time of holding the rider are extended, to be connected to the joint members 57 on both side surfaces of the air bag 50, respectively. Incidentally, the belt stay 52 has arcuate left and right portions integrated with each other, and is preferable for firmly fastening the support belts 51.

Figure 9:
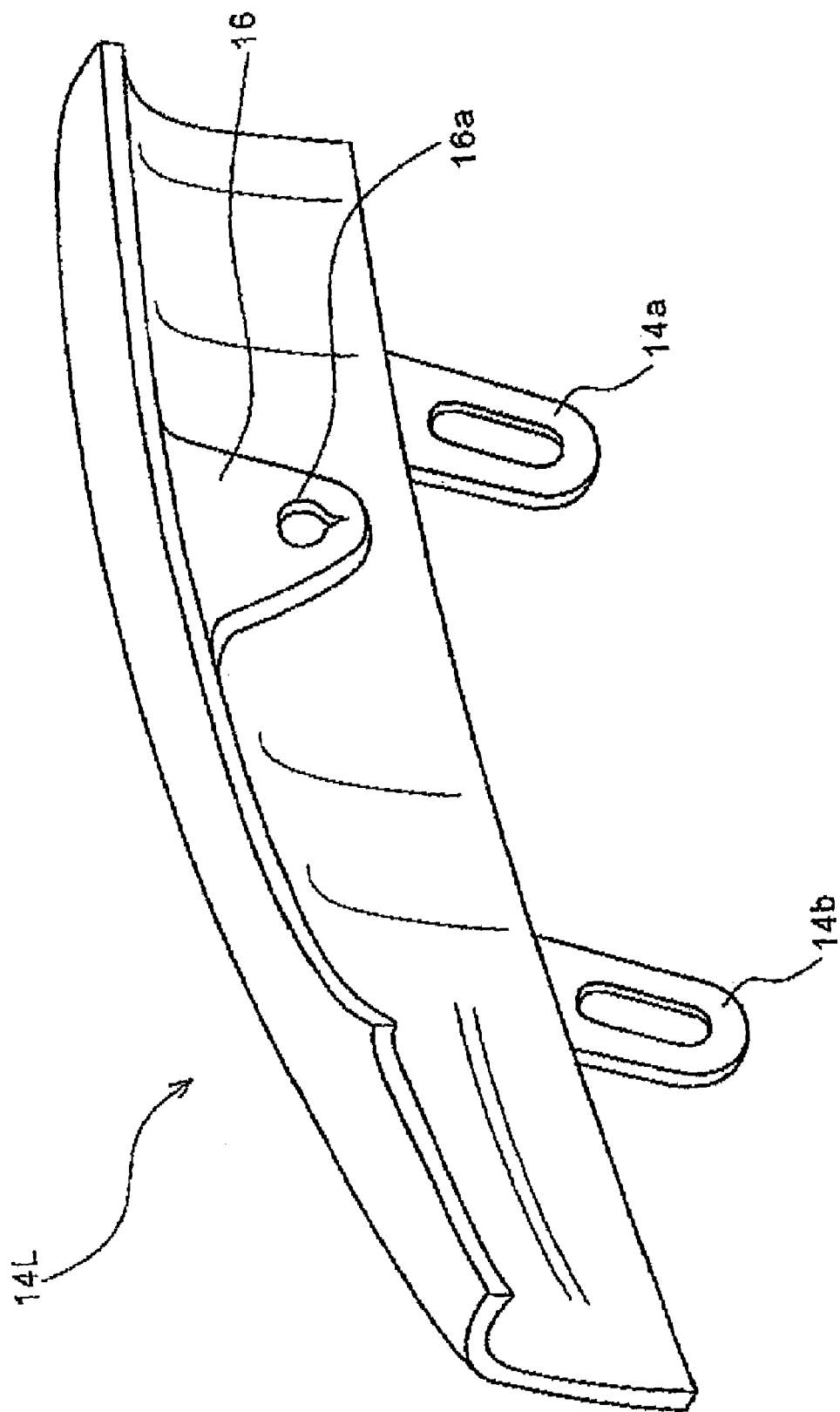
FIG. 9 is a perspective view of a belt cover according to one embodiment of the present invention.

FIG. 9 is a perspective view showing an example of the shape of the belt cover 14L (left side). The belt covers 14 inclusive of the right-side belt cover 14R are formed of a flexible synthetic resin. Therefore, when the fastening between the cover stay 16 and the vehicle body side is broken, the belt cover 14 can be developed toward the vehicle body outer side while the cover stays 14a and 14b fastened to the vehicle body side are bent. The belt cover 14 according to this embodiment is characterized in that a clip hole 16a in the cover stay 16 is provided with a brittle portion. The clip hole 16a is provided with a notch at a part thereof so that it is ruptured when a force reaching or exceeding a predetermined value is exerted in the direction of opening the belt cover 14.

Figure 10:
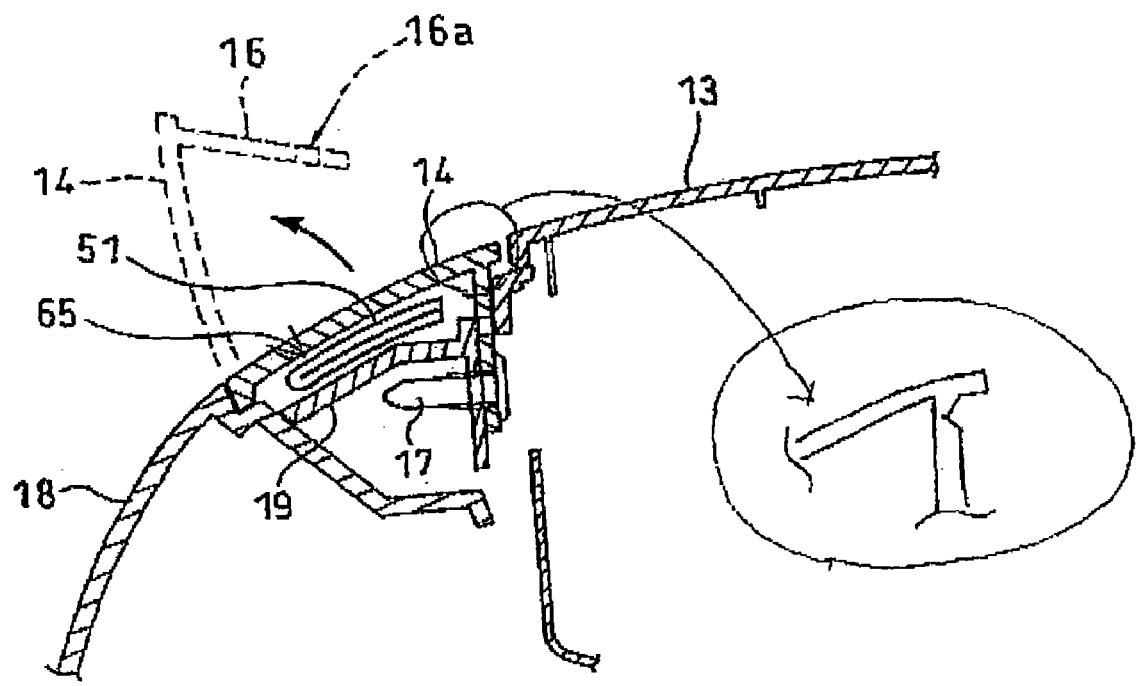
FIG. 10 is a sectional view taken along line B-B of FIG. 6.

FIG. 10 is a sectional view taken along line B-B of FIG. 6, and shows the structure at and around the cover stay 16. The same symbols as used above denote the portions the same as or equivalent to the portions above-mentioned. The cover stay 16 of the belt cover 14 is fastened by a clip 17 to a bottom plate 19, which is joined to a side shelter 18 so as to form a bottom portion of the storing space 65. At the time of inflation of the air bag 50, the support belt 51 (see FIG. 7) is pulled up toward the vehicle body upper side, whereby a force is exerted in the direction of rupturing the clip hole 16a of the cover stay 16. The clip hole 16a is ruptured when a force reaching or exceeding a predetermined value is exerted thereon, whereby the belt cover 14 is opened. Therefore, the pulling load necessary for opening the belt cover 14 can be regulated by modifying the strength of the clip hole 16a.

Figure 11:
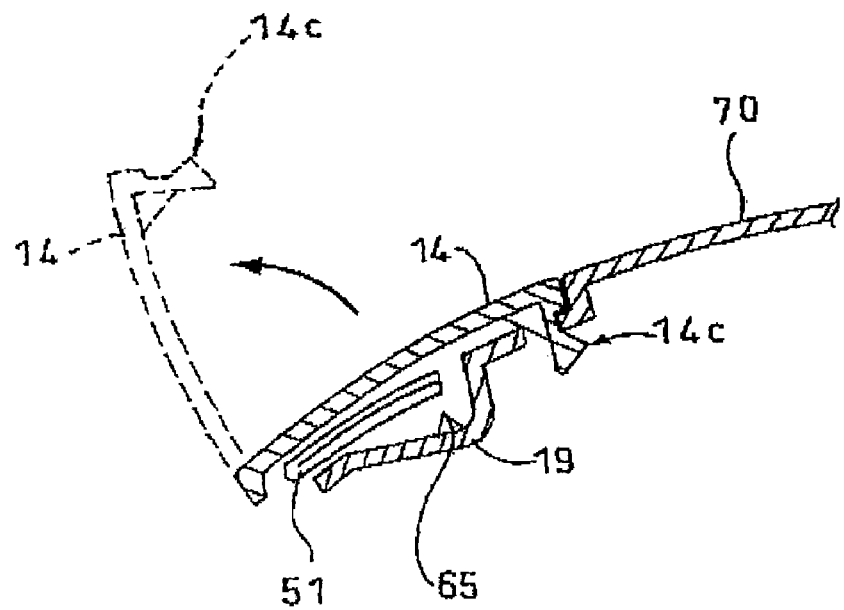
FIG. 11 is a sectional view taken along line C-C of FIG. 6.

FIG. 11 is a sectional view taken along line C-C of FIG. 6, and shows an engagement structure of the belt cover 14 at other position than the installation position of the cover stay 16. The same symbols as used above denote the portions the same as or equivalent to the portions above-mentioned. The belt cover 14 and the top shelter 70 are disengageably engaged with each other by a projected portion 14c provided at a side edge portion of the belt cover 14. When a force reaching or exceeding a predetermined value is exerted at the time of inflation of the air bag 50, the belt cover 14 and the top shelter 70 are slightly deformed relative to each other so as to overcome the function of the projected portion 14c and to be disengaged from each other, whereby the belt cover 14 is opened. Therefore, even at other portions than the cover stay 16, the belt cover 14 is prevented from being opened due to some external factor at normal time, and water and dust are prevented from penetrating into the storing space 65. Besides, the pulling load required for opening the belt cover 14 can be regulated, for example, by modifying the shape of the projected portion 14c.

Figure 12:
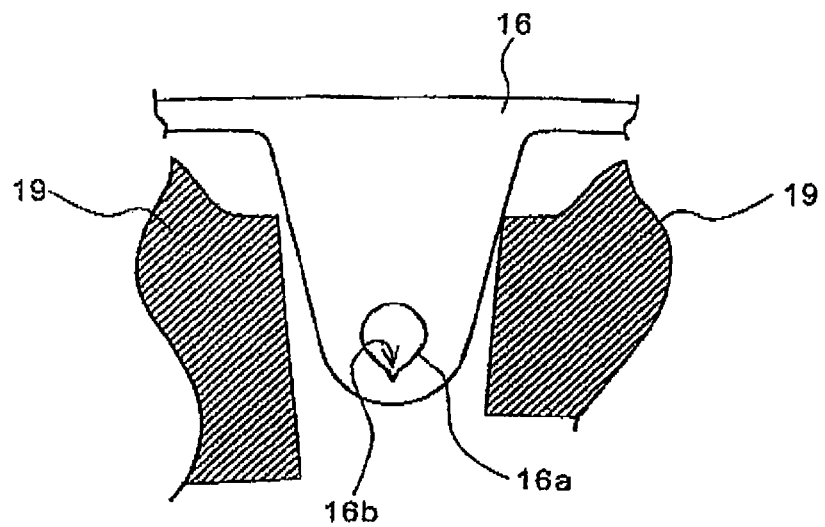
FIG. 12 is a detailed illustration of a cover stay according to one embodiment of the present invention.

FIG. 12 is a detailed illustration of the cover stay 16. As has been above-mentioned, the clip hole 16a according to this embodiment is provided with a substantially V-shaped notch 16b as a brittle portion at a lower position in the figure so as to be ruptured when a load greater than a predetermined value is exerted thereon.

Figure 13:
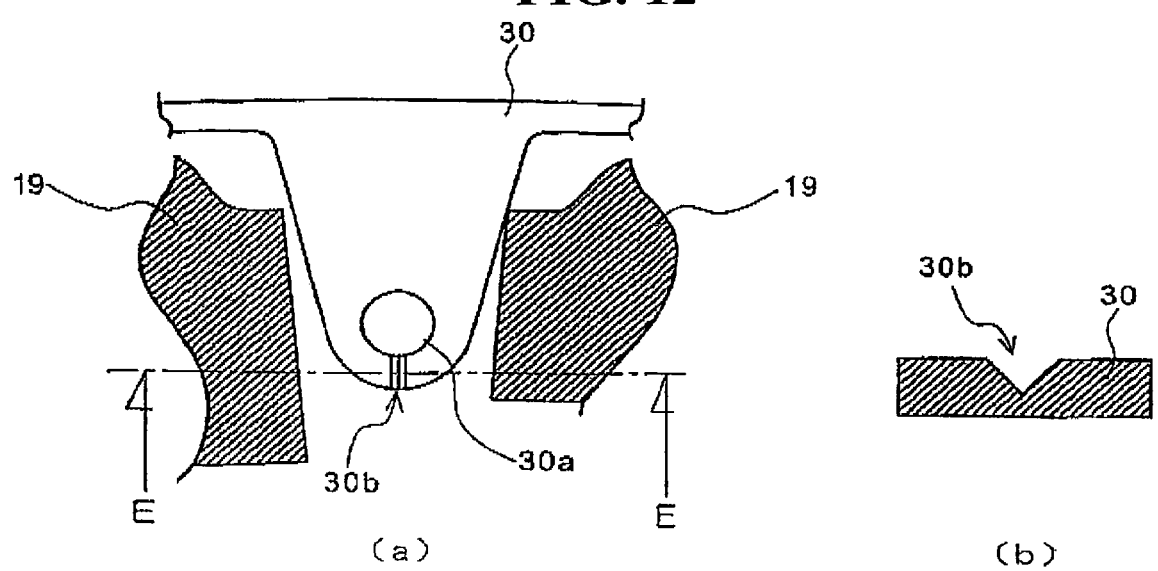
FIG. 13 is a detailed illustration of a cover stay according to a modified example of one embodiment of the present invention.
Figure 14:
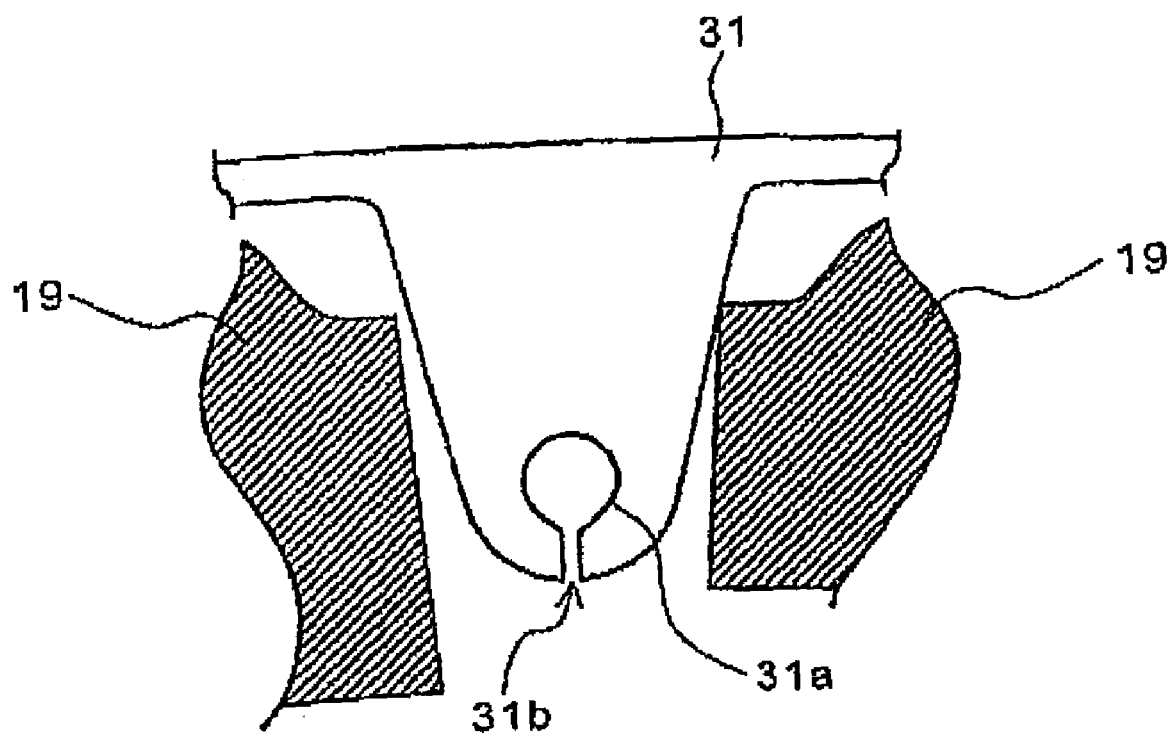
FIG. 14 is a detailed illustration of a cover stay according to a second modified example of one embodiment of the present invention.

FIGS. 13(a) and 13(b) are detailed illustrations of a cover stay 30 as a modified example of the cover stay 16. As shown in FIG. 13(b), which is a sectional view taken along line E-E of FIG. 13(a), a clip hole 30a according to this modified example is characterized by a groove 30b having a substantially v-shaped section, which is provided at a lower position in the figure. In addition, FIG. 14 shows a cover stay 40 as a second modified example of the cover stay 16. A clip hole 31a according to this second modified example is characterized by a slit 31b provided as a brittle portion at a lower position in the figure. As above-mentioned, the shape of the clip hole 16a provided in the cover stay 16 can be modified variously, and it is thereby possible to easily regulate the pulling load required for opening the belt cover 14.

As has been described above, according to the support belt storing structure of the present invention, it is possible to obtain an air bag support belt storing structure which is less likely to be disengaged at normal time and which makes it possible to protect the storing spaces for the support belts from water, dust and the like and to easily regulate the load necessary for opening the belt covers. In addition, the cover stays and fitting (engaging) portions can be so configured as to be hidden on the inner side of other armor parts, so that the appearance at and around the belt covers can be enhanced easily.

The developing directions of the belt covers, the shapes and layout of the belt covers and the clip holes, etc. are not limited to the above-mentioned modified examples, and various modifications can be applied thereto.

We claim:

1. An air bag support belt storing structure comprising:
   an air bag module disposed at or approximately near a center of a vehicle body, in a vehicle widthwise direction;
   support belts connecting an air bag to the vehicle body;
   storage spaces that extend in a front-rear direction of said vehicle body for storing said support belts; and
   a resin cover, wherein
   said storage spaces are provided on left and right sides on a rear side of said air bag module,
   an outer side of said cover, in the widthwise direction, is fastened to said vehicle body,
   an inner side of said cover, in the vehicle widthwise direction, is fitted to said vehicle body,
   and a substantially central portion of said inner side of said cover, in said vehicle widthwise direction, is fixed by a clip, and
   said cover is opened to an outside, with said outer side of said cover in the vehicle widthwise direction, as an axis.

2. The air bag support belt storing structure as set forth in claim 1,
   wherein
   said storage spaces are each covered with said cover.

3. The air bag support belt storing structure as set forth in claim 1, wherein said clip is engaged in a clip hole provided in said cover, and a surface of said cover defining said clip hole is provided with a brittle notch portion.

* * * * *